Figure 1:
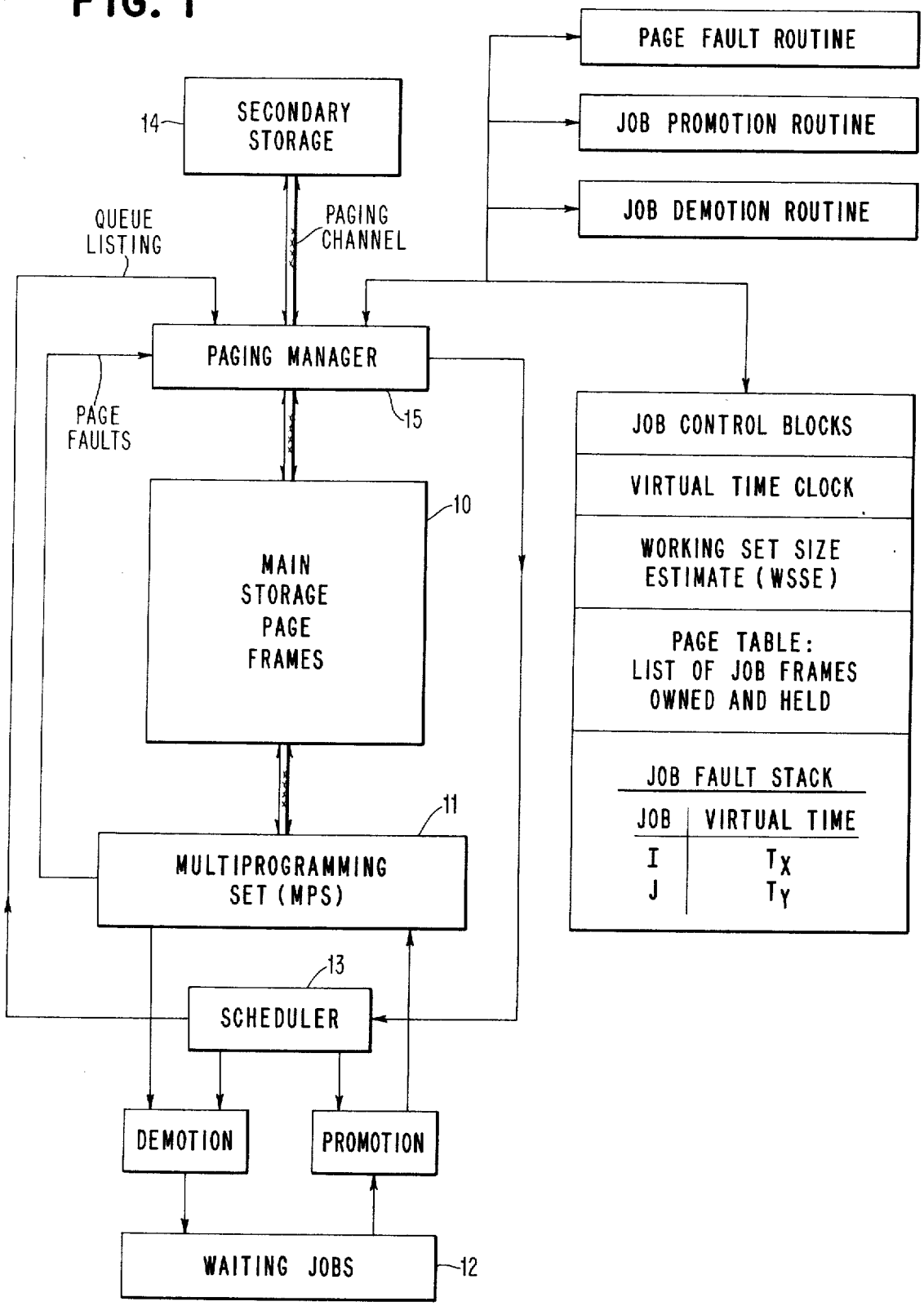
Figure 2:
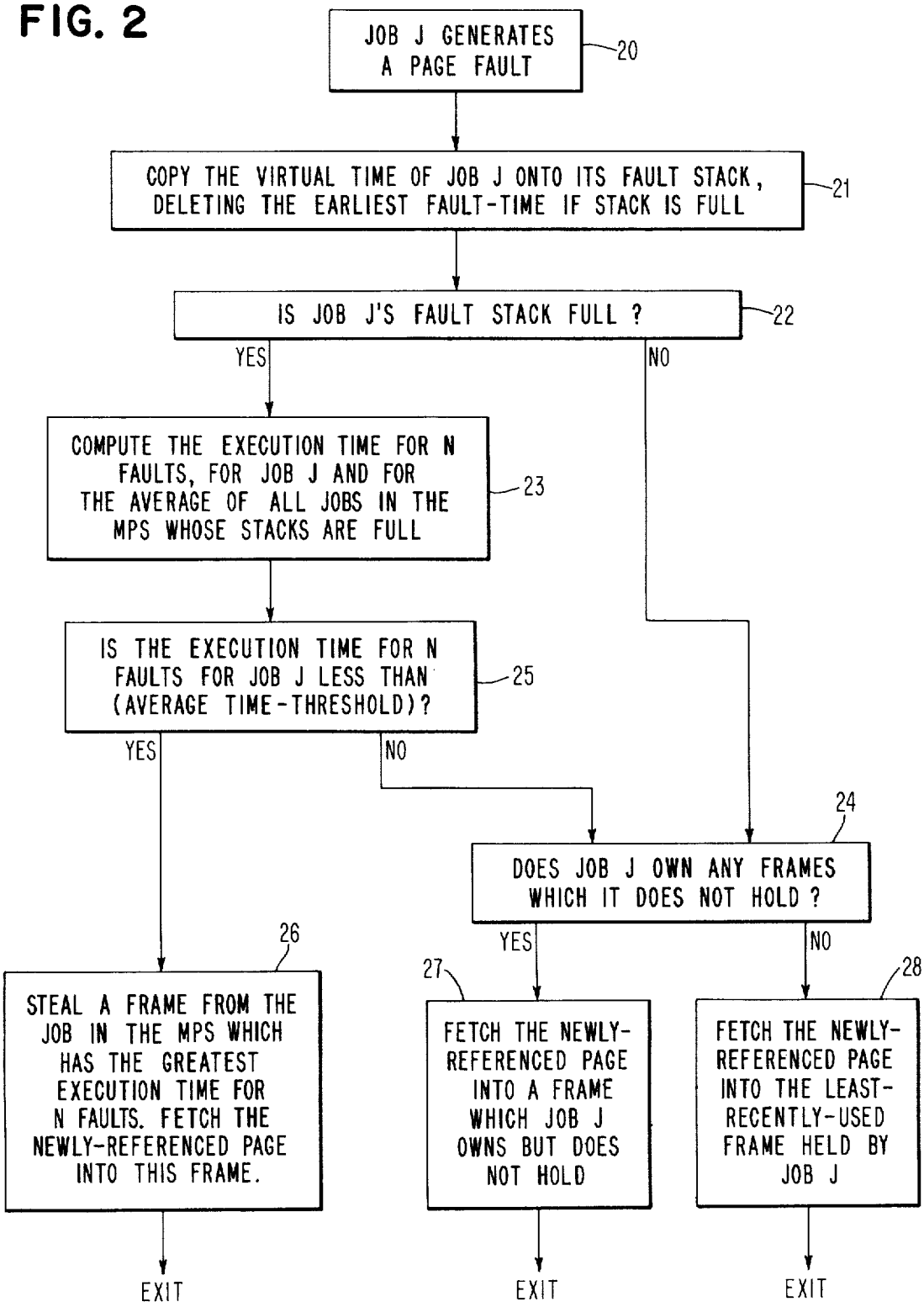
Figure 3:
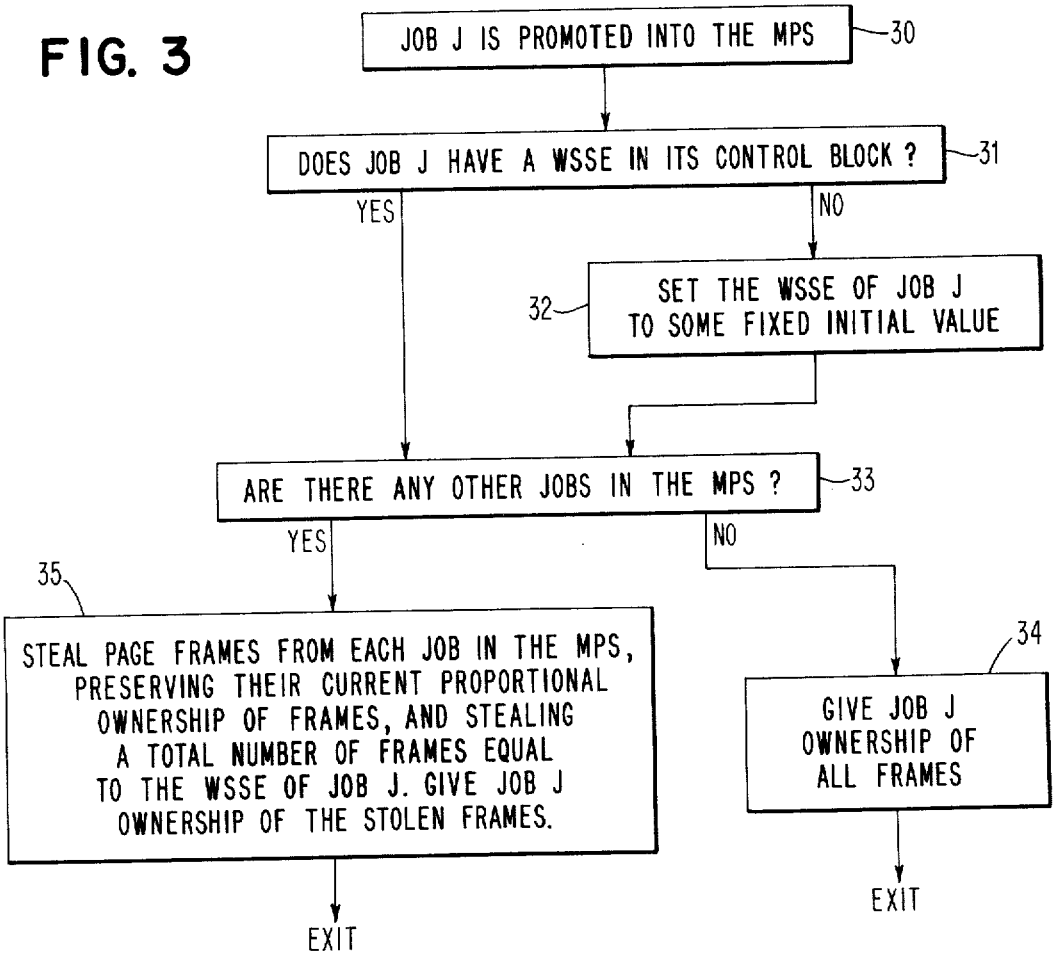
Figure 4:
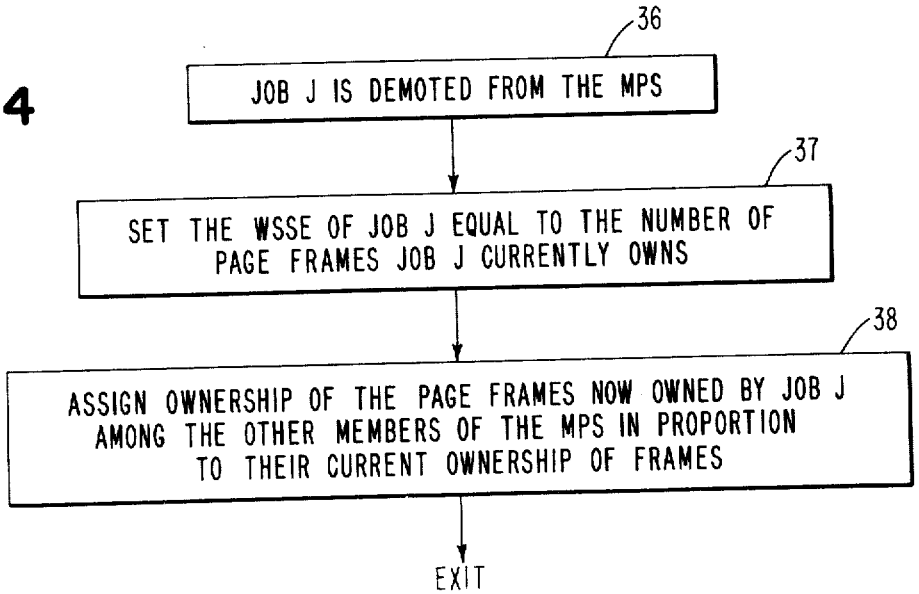

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 10

T940,018

PAGE ALLOCATION STRATEGY FOR MULTIPROGRAMMING SYSTEMS WITH VIRTUAL MEMORY

Donald Dean Chamberlin, San Jose, Calif., Samuel Henry Fuller, Pittsburgh, Pa., and Leonard Ying-Wu Liu, Saratoga Calif., assignors to International Business Machines Corporation, Armonk, N.Y.

Filed Mar. 13, 1974, Ser. No. 450,626
Int. Cl. G06f 9/18
U.S. Cl. 444—1
3 Sheets Drawing. 7 Pages Specification

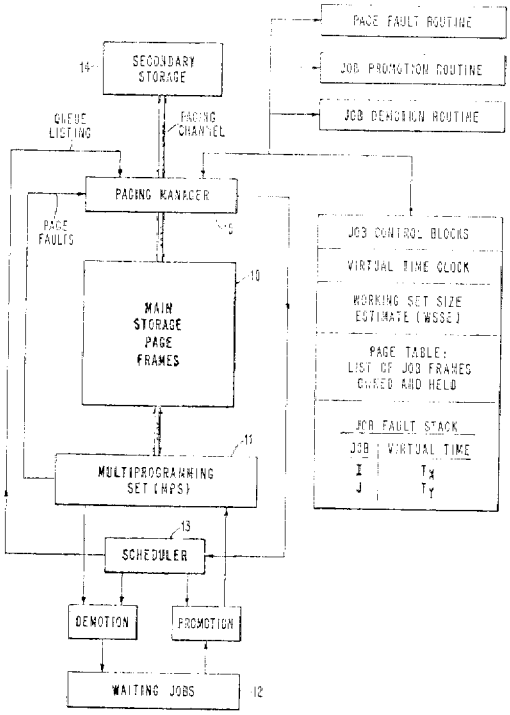

A time shared virtual memory system can share main memory among plural jobs. When a page of data needed by a job is not in main storage, a "page fault" is generated causing the page to be fetched from secondary storage into a main storage page frame which is stolen by a job with less than average execution time per fault from the job with the highest execution time per fault. Other jobs must use unheld frames or refill a least recently used frame owned by that job. Track is kept of the amount of elapsed execution (virtual) time used by the job to calculate average execution time. Waiting jobs are promoted into the multiprogramming set of jobs being performed. The WSSE of a job is set arbitrarily or used to allocate the number of page frames for the job from other jobs, preserving current proportional frame allocation. A demoted job releases page frames to be assigned to other jobs in proportion to their current ownership of frames.